United States Patent
Yin

(10) Patent No.: US 8,462,816 B2
(45) Date of Patent: Jun. 11, 2013

(54) METHOD AND APPARATUS FOR MAPPING AND DE-MAPPING SERVICE DATA

(75) Inventor: Hui Yin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 270 days.

(21) Appl. No.: 13/073,693

(22) Filed: Mar. 28, 2011

(65) Prior Publication Data

US 2011/0182580 A1    Jul. 28, 2011

Related U.S. Application Data

(63) Continuation of application No. PCT/CN2009/073897, filed on Sep. 11, 2009.

(30) Foreign Application Priority Data

Sep. 28, 2008    (CN) .......................... 2008 1 0216594

(51) Int. Cl.
  *H04J 3/24*    (2006.01)
(52) U.S. Cl.
  USPC .......................................... 370/474; 370/464
(58) Field of Classification Search
  None
  See application file for complete search history.

(56) References Cited

U.S. PATENT DOCUMENTS

| | | | |
|---|---|---|---|
| 7,472,199 B1 * | 12/2008 | Rutherford et al. ........... | 709/233 |
| 2003/0048813 A1 | 3/2003 | Lahav et al. | |
| 2004/0062277 A1 * | 4/2004 | Flavin et al. .................. | 370/474 |
| 2006/0104309 A1 * | 5/2006 | Vissers et al. ................. | 370/474 |
| 2010/0221005 A1 * | 9/2010 | Zhao .............................. | 398/52 |

FOREIGN PATENT DOCUMENTS

| | | |
|---|---|---|
| CN | 1770673 A | 5/2006 |
| CN | 1832629 A | 9/2006 |
| CN | 1848717 A | 10/2006 |
| CN | 1983885 A | 6/2007 |
| CN | 101378399 A | 3/2009 |
| CN | 101384093 A | 3/2009 |

OTHER PUBLICATIONS

International Search Report in corresponding PCT Application No. PCT/CN2009/073897 (Dec. 17, 2009).
International Searching Authority, Written Opinion in International Application No. PCT/CN2009/073897 (Dec. 17, 2009).
International Telecommunications Union (ITU), ITU-T Telecommunication Standardization Sector of ITU, "Series G: Transmission Systems and Media, Digital Systems and Networks; Digital Transmission Systems—Digital Networks—Management of Transport Network; Enterprise Viewpoint for Topology Management," G.852.3 (Mar. 1999).

* cited by examiner

Primary Examiner — Chi Pham
Assistant Examiner — Raul Rivas
(74) Attorney, Agent, or Firm — Leydig, Voit & Mayer, Ltd.

(57) ABSTRACT

A method for mapping service data is provided. The method includes: calculating a payload value according to service data to be transmitted; inserting the payload value into a payload value region of a corresponding frame in one group of data frames, in which the payload value is used to indicate an amount of service data carried by corresponding containers in a next group of data frames; and extracting service data of a payload value size carried by a previous group of data frames, and mapping the service data to a payload region after being respectively carried by corresponding containers. Correspondingly, an apparatus for mapping service data, and a method and an apparatus for de-mapping service data are further provided. The invention can be applied to the mapping of service data of various rates, moreover, service data of various types can be mapped by adopting one data structure of data frames.

5 Claims, 6 Drawing Sheets

| 1 | 6 | 7 | 8 | 14 | 15 | 16 | 17 | | 3824 | 3825 | 4080 |
|---|---|---|---|---|---|---|---|---|---|---|---|
| FAS | MFAS | OTUOH | | Payload value | | | | Service data payload borne by an OPU | | | OTU FEC |
| ODUOH | | | | Payload value | | | | | | | |
| | | | | Payload value | | | | OPU Payload | | | |
| | | | | PSI | | | | | | | |

METHOD AND APPARATUS FOR MAPPING AND DE-MAPPING SERVICE DATA

CROSS-REFERENCE TO RELATED APPLICATIONS

This application is a continuation of International Application No. PCT/CN2009/073897, filed on Sep. 11, 2009, which claims priority to Chinese Patent Application No. 200810216594.4, filed on Sep. 28, 2008, both of which are hereby incorporated by reference in their entireties.

FIELD OF THE TECHNOLOGY

The present invention relates to the field of communications, and more particularly to a method and an apparatus for mapping and de-mapping service data.

BACKGROUND OF THE INVENTION

Due to bandwidth demands resulting from increasing demands for various services, for example, voice, data, and multimedia, from human beings, an Optical Transport Network (OTN) increasingly becomes a core network for carrying services of each operator.

When the OTN network is widely applied, it is necessary to map services of various rates to a high rate Optical Channel Transport Unit (OTU) network for transporting, and it is necessary to de-map the high rate OTUk to obtain multiple paths of low rate services. Sizes of an OTUk (k is 1, 2, 3, or other natural numbers) frame are consistent, but a frame rate is increased as k is increased. In the prior art, a multiplexing and mapping form of an OTN is defined, differences between OTUk and OTUj clocks are compensated by setting positive justification opportunity (PJO) and negative justification opportunity (NJO) bytes in a frame structure of the high rate OTU, so as to realize conversion between OTN signals of different rate levels. When the low rate OTUj data is recovered by de-mapping, an asynchronous clock of the OTUj needs to be recovered from a high rate OTUk clock. In the prior art, justification is performed through the PJO and NJO bytes, that is, clock information is delivered through the PJO and NJO bytes.

During the implementation of the present invention, the inventor finds that the prior art at least has the following disadvantages. In the prior art, the mapping is implemented by adopting the PJO and NJO bytes, and information represented by the PJO and NJO bytes is limited, so that multiplexing and mapping to the OTN network can be performed on services of only a small part of rate levels, and de-mapping can also be performed on service data of only a small part of rate levels, and thus multiplexing and mapping and de-mapping cannot be implemented on the services of various types in the existing network.

SUMMARY OF THE INVENTION

The embodiments of the present invention provide a method and an apparatus for mapping and de-mapping service data, which may be used for mapping and de-mapping the service data of various rate levels.

In an embodiment, the present invention provides a method for mapping service data, in which the service data is carried by groups of data frames, each group of data frames includes at least two data frames, each of the data frames includes a payload value region and a payload region, the payload region includes multiple containers, and each container carrys one path of service. The method includes the following steps:

A payload value is calculated according to service data to be transmitted in a current frame group.

The payload value is inserted into a payload value region of a corresponding frame in one group of data frames, in which the payload value is used to indicate an amount of service data carried by each corresponding container in the data frames in a next frame group.

Service data of a payload value size carried by a previous group of data frames is extracted, and the service data is mapped to a payload region after corresponding containers carry the service data.

In an embodiment, the present invention further provides a method for generating a de-mapping clock for service data, which includes the following steps:

A data frame is received, and a data writing virtual clock is obtained according to a payload value in the data frame.

A service clock gap is generated according to a de-mapping clock gap.

A non-gap statistical quantity of the data writing virtual clock is compared with a non-gap statistical quantity of the service clock gap, and the de-mapping clock gap is generated according to a comparison result.

A phase-locked loop process is performed on the de-mapping clock gap, so as to obtain a recovery clock signal required by a de-mapping process.

In an embodiment, the present invention further provides a method for de-mapping service data, which includes the following steps:

A data frame is received, valid service data in the data frame is extracted according to a payload value in the data frame, and the valid service data is buffered in a storage unit.

A data writing virtual clock is obtained according to the payload value; a service clock gap is generated according to a de-mapping clock gap.

A non-gap statistical quantity of the data writing virtual clock is compared with a non-gap statistical quantity of the service clock gap, and the de-mapping clock gap is generated according to a comparison result.

A phase-locked loop process is performed on the de-mapping clock gap, so as to obtain a recovery clock signal required by a de-mapping process.

Service data is read from the storage unit according to the obtained recovery clock signal.

In an embodiment, the present invention provides an apparatus for mapping service data, in which the service data is carried by groups of data frames, each group of data frames includes at least two data frames, each of the data frames includes a payload value region and a payload region, the payload region includes multiple containers, and each container carrys one path of service. The apparatus includes a calculation unit, an insertion unit, and a mapping unit.

The calculation unit is configured to calculate a payload value according to service data to be transmitted.

The insertion unit is configured to insert the payload value into a payload value region of a corresponding frame in one group of data frames, in which the payload value is used to indicate an amount of service data carried by corresponding containers in a next group of data frames.

The mapping unit is configured to extract service data of a payload value size carried by a previous group of data frames, and map the service data to a payload region after being respectively carried by corresponding containers.

In an embodiment, the present invention further provides an apparatus for generating a de-mapping clock, which includes a virtual clock statistic unit, a service gap statistic unit, a comparison unit, a de-mapping clock gap generating unit, and a recovery clock generating unit.

The virtual clock statistic unit is configured to receive a data frame, obtain a data writing virtual clock according to a payload value in the data frame, and accumulate a non-gap quantity of the data writing virtual clock to obtain a non-gap statistical quantity of the data writing virtual clock.

The service gap statistic unit is configured to generate a service clock gap according to a de-mapping clock gap, and accumulate a non-gap quantity of the service clock gap to obtain a non-gap statistical quantity of the service clock gap.

The comparison unit is configured to compare the non-gap statistical quantity of the data writing virtual clock with the non-gap statistical quantity of the service clock gap, and obtain a comparison result.

The de-mapping clock gap generating unit is configured to generate the de-mapping clock gap according to the comparison result.

The recovery clock generating unit is configured to perform a phase-locked loop process on the de-mapping clock gap, so as to obtain a recovery clock signal required by a de-mapping process.

In an embodiment, the present invention further provides an apparatus for de-mapping service data, which includes a virtual clock statistic unit, a service gap statistic unit, a comparison unit, a de-mapping clock gap generating unit, a recovery clock generating unit, and a reading and writing unit.

The virtual clock statistic unit is configured to receive a data frame, obtain a data writing virtual clock according to a payload value in the data frame, and accumulate a non-gap quantity of the data writing virtual clock to obtain a non-gap statistical quantity of the data writing virtual clock.

The service gap statistic unit is configured to generate a service clock gap according to a de-mapping clock gap, and accumulate a non-gap quantity of the service clock gap to obtain a non-gap statistical quantity of the service clock gap.

The comparison unit is configured to compare the non-gap statistical quantity of the data writing virtual clock with the non-gap statistical quantity of the service clock gap, and obtain a comparison result.

The de-mapping clock gap generating unit is configured to generate the de-mapping clock gap according to the comparison result.

The recovery clock generating unit is configured to perform a phase-locked loop process on the de-mapping clock gap, so as to obtain a recovery clock signal required by a de-mapping process.

The reading and writing unit is configured to extract valid service data in the data frame according to the payload value in the data frame when receiving the data frame, buffer the valid service data, and read the valid service data according to the recovery clock signal generated by the recovery clock generating unit.

In the embodiments of the present invention, a mapping rate is justified by using the payload value, justification information carried by the payload value has a larger justification range than justification information carried by a justification opportunity byte, so that the present invention can be applied to mapping and de-mapping service data of various rates, the service data of various types can be mapped and de-mapped by adopting one data structure of the data frame, and a network system is simply and easily implemented.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention; persons of ordinary skill in the art can obtain other drawings according to the accompanying drawings without creative efforts.

DETAILED DESCRIPTION OF THE EMBODIMENTS

The technical solution of the present invention is clearly described in the following with reference to the accompanying drawings. The embodiments to be described are only a part rather than all of the embodiments of the present invention. All other embodiments obtained by persons skilled in the art based on the embodiments of the present invention without creative efforts should fall within the protection scope of the present invention.

A mapping method and a de-mapping method according to embodiments of the present invention are implemented based on groups of data frames, in which each group of data frames includes at least two data frames, each of the data frames includes a payload value region and a payload region, the payload region includes M containers, each container carrys one path of service, and data of the payload value region (hereinafter referred to as a payload value) is used to indicate an amount of service data carried by corresponding containers in the next group of data frames. In the following description of the embodiments of the present invention, the detailed description is given by taking an OTU frame structure in an OTN service as an example, but it should be noted that the embodiments of the present invention are not limited to the OTU frame structure.

Figures 1, 2, 3:
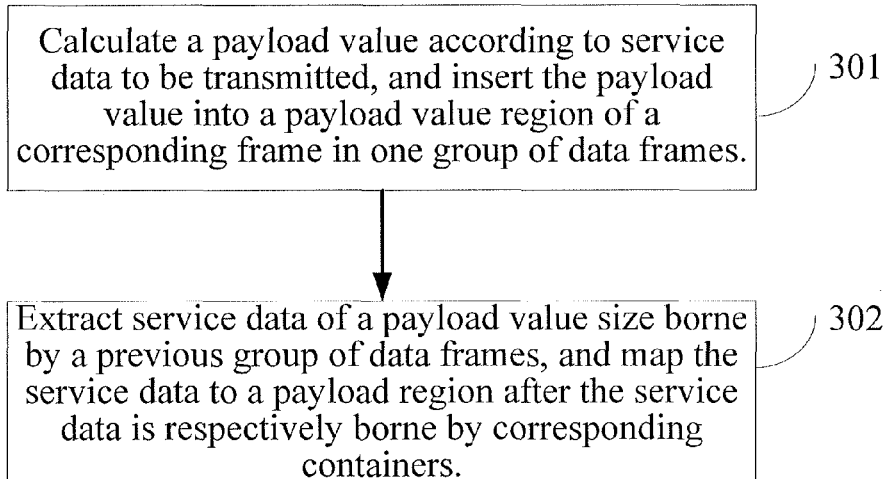
FIG. 1 shows a frame structure of a data transmission unit OTU in an OTN.
FIG. 2 shows a frame structure of an OTUE according to an embodiment of the present invention.
FIG. 3 is a flow chart of a multiplexing and mapping method in an OTN according to an embodiment of the present invention.

In order to describe the implementation of the present invention more clearly, a structure of a data transmission unit OTU in the OTN is introduced. Referring to FIG. 1, a currently common OTU frame structure includes an OPU Payload part, where an OPU Payload is a service data payload carried by an Optical Channel Payload Unit (OPU), an OTU FEC part (FEC is short for forward error correction), and an Overhead (OH) part that is resulted from the transmission of the service payload. The OH part is as follows:

OPU OH; ODU OH (that is, Optical Channel Data Unit OH); and OTU OH.

OPUk OH is located at the position corresponding to columns 15 and 16. The part includes a Payload Structure Identifier (PSI) byte, a Justification Control (JC) byte, a Negative Justification Opportunity (NJO) byte, a Positive Justification Opportunity 1 (PJO1) byte, and a Positive Justification Opportunity 2 (PJO2) byte. Whether position data of NJO, PJO1, and PJO2 is valid data may be explained through the JC byte. Delivered clock information may be justified through the justification bytes.

Referring to FIG. 2, in an embodiment, the present invention provides a new frame structure named as OTUE. As compared with FIG. 1, the OTUE frame structure in FIG. 2 has the following changes.

1. The JC byte and the previous reserved bytes are replaced with payload value bytes; the NJO byte is not used and is defined as a reserved byte, in which the payload value indicates the number of payloads of the service data to be transmitted.

2. The PJO1 and the PJO2 bytes are no longer used as the JC byte, but become a part of a payload; the service data may be filled in the OPU Payload region, and a position and a size of the filling byte are determined by the corresponding payload value byte.

The optical network can simultaneously transmit M paths of services through multiplexing and mapping. Correspondingly, the payload region of the OTUE frame includes M containers, each container correspondingly transmits one path of service; every N frames of OTUE form a group, in which a multi-frame byte MFAS in the OTUE frame structure represents a sequence position of current frames, in which M and N are natural numbers.

Referring to FIG. 3, on the basis of the OTUE frame structure shown in FIG. 2, a multiplexing and mapping method in an OTN according to an embodiment of the present invention includes the following steps:

Step 301: Calculate a payload value according to service data to be transmitted, and insert the payload value into a payload value region of a corresponding frame in one group of data frames.

The service data carried in an OTUE frame includes an ODUk service, an SDH service, and an Ethernet service. For ease of description, it is assumed that the OTUE may transmit 16 paths of services at the utmost, the payload region in the OTUE may be divided into 16 sub-time slots, so as to provide 16 containers, in which each container correspondingly transmits one path of service; the last 4 bits of an MFAS byte may represent the sequence position of the current frame in each group of frames.

The payload values of the 16 paths of transmitted services are respectively calculated and buffered, and the calculated payload values are inserted into payload value regions in frames having corresponding sequence numbers in one group of frames.

The payload value may be calculated by using the following method. Firstly, a maximum payload value and a minimum payload value are preset according to a currently transmitted service and a rate of a current OTUE, an amount of service data to be transmitted currently is accumulated to obtain a service data accumulative value; the service data accumulative value is compared with a historical payload value, in which the historical payload value is a payload value calculated last time, for example, the payload value counted for the corresponding service in a last frame, if the historical payload value is greater than the service data accumulative value, it indicates that the mapping transmission is too fast, and a current payload value is justified to be the preset minimum payload value, and if the historical payload value is less than the service data accumulative value, it indicates that the mapping transmission is too slow, and the current payload value is justified to be the preset maximum payload value.

In the embodiment of the present invention, the payload value is justified between the maximum value and the minimum value according to a rate of the mapping transmission, so that the mapping transmission is maintained at a relatively stable rate, thereby reducing jitter generated during the mapping process. By using the method for calculating the payload value, the mapping and the de-mapping are quite simply implemented, the complexity of recovering a de-mapping clock is reduced, and the performance of a recovered clock can be guaranteed.

Step 302: Extract service data according to the size of the payload carried by the previous group of data frames, and map the service data to a payload region after the service date is respectively carried by corresponding containers.

The specific implementation of the mapping is that service data of a payload value in the size of the payload value in an $M^{th}$ frame in a previous group of frames is extracted, and the exacted service data is uniformly filled in $M^{th}$ containers of all the frames of the current group of frames, so that the service data is mapped to the payload region of the OTUE, where $0 \leq M \leq 15$.

Figure 4:
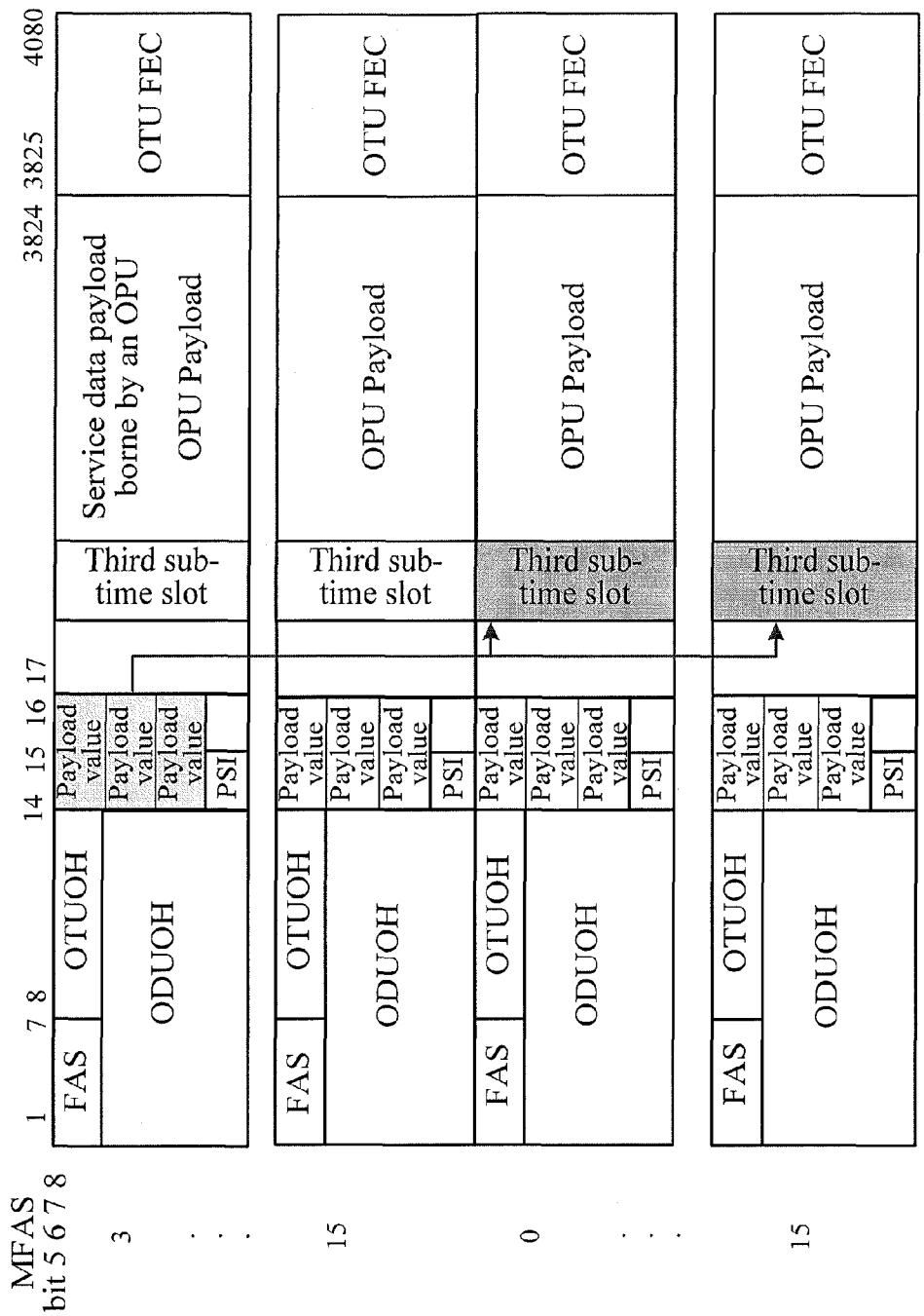
FIG. 4 is a schematic diagram in which a payload value indicates data carried by containers in the multiplexing and mapping method in the OTN according to an embodiment of the present invention.

For example, as shown in FIG. 4, a payload value in a third frame in a first group indicates the quantity of the payloads which should be transported in the containers formed for third sub-time slots of all $0^{th}$-$15^{th}$ frames of OPUE in a second group, and correspondingly, a payload value in a fourth frame of OTUE indicates the number of the payloads transported in the containers formed by fourth sub-time slots of next $0^{th}$-$15^{th}$ frames of OTUE.

The payload value is calculated in advance in the previous group of frames, and the service data is carried in a next group of frames according to the payload value, so that the time is sufficient for uniformly transporting the payload value, thereby preventing the jitter during the transmission process due to the non-uniform transport.

In the embodiment of the present invention, a mapping rate is justified by using the payload value, justification information carried by the payload value has a larger justification range than justification information carried by a justification opportunity byte, so that the present invention can be applied to mapping the service data of various rates, the service data of various types can be mapped by adopting one data structure of the data frame, and a network system is simply and easily implemented.

Figure 5:
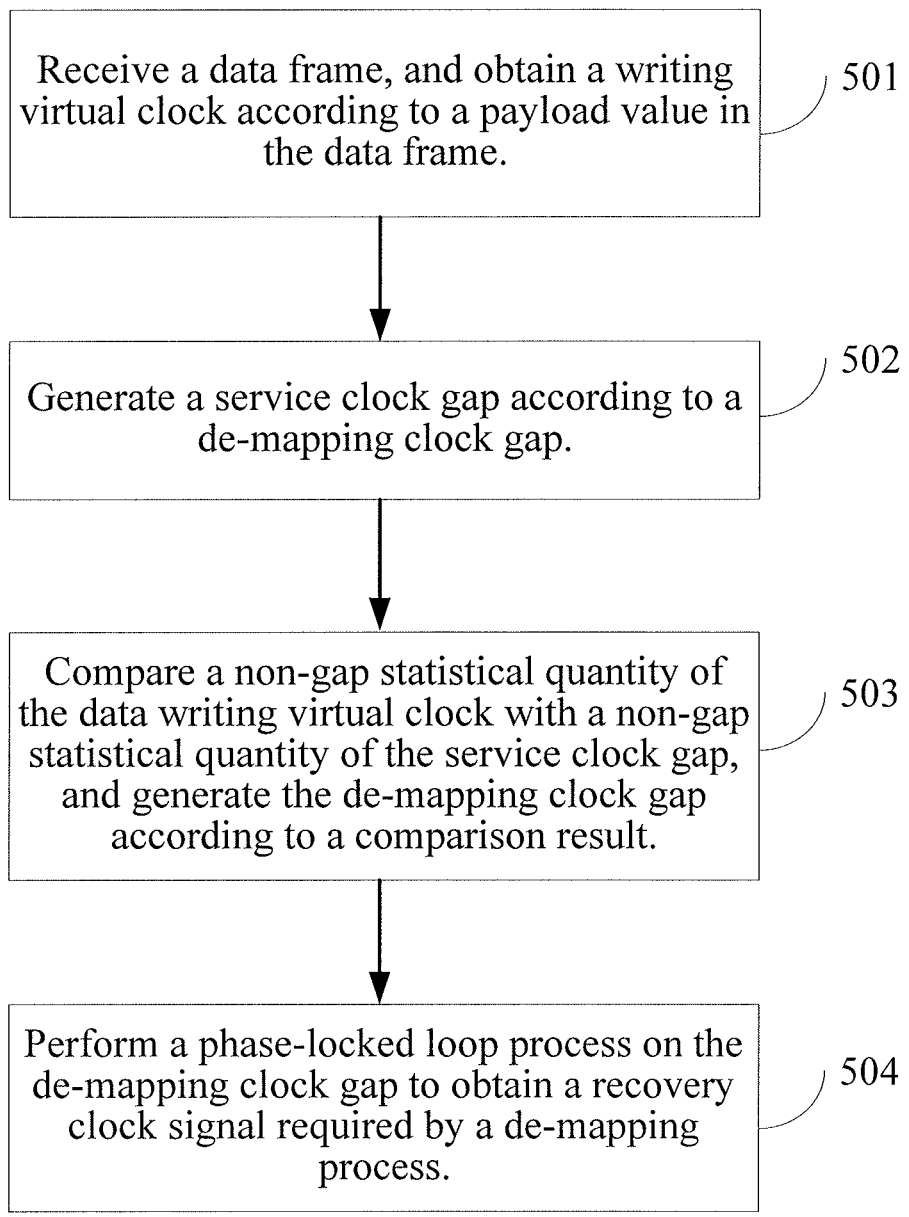
FIG. 5 is a flow chart of a method for generating a de-mapping clock in an OTN according to an embodiment of the present invention.

Correspondingly, referring to FIG. 5, in an embodiment, the present invention provides a method for generating a de-mapping clock in an OTN, which includes the following steps:

Step 501: Receive a data frame, and obtain a data writing virtual clock according to a payload value in the data frame.

According to the payload value transmitted in each received group of OTUE data frames, it may be known that an amount of the valid service data transmitted in each 16-frame OTUE clock cycle (assumed as P) is a sum (assumed as C) of the payload values carried by each frame. Thus, the situation of the uniform distribution of C in P may be obtained by performing calculation. A data writing clock is generated firstly according to the distribution of the valid service data, and then a homogenization treatment is performed on the data writing clock to obtain the data writing virtual clock. The case there is no gap indicates that the valid service data exists in the clock cycle, and the case there is a gap indicates that the valid service data does not exist in the clock cycle. The valid service data is a sum of the service data of each service excluding the service data of the OH byte.

According to the payload value, the amount of the corresponding service valid data carried in each received 16-frame OTUE data may be known. If the data writing clock is directly generated by directly using the received payload value, and the service data transported in the OTUE is counted according to the data writing clock, the service data is nonlinearly increased, thereby affecting accuracy of subsequent data comparison, which affects the performance of recovered clock. Therefore, the data writing virtual clock is a virtual and uniform valid data that indicates pulse, and can linearly and uniformly indicate the valid service data transmitted by each group of data frames.

Step 502: Generate a service clock gap according to a de-mapping clock gap.

The process of generating the service clock gap according to the de-mapping clock gap includes: obtaining the service clock gap according to the current de-mapping clock gap and a ratio of a valid service rate of mapping transmission to a service rate recovered by de-mapping. During de-mapping, the data frame is de-mapped according to a de-mapping clock gap, in which each service data is separately de-mapped, and the clock gap of each service may be inconsistent, so that a service clock gap needs to be generated corresponding to one service. For an SDH service, during de-mapping, it is necessary to recover only SDH data carried in the OTUE frame, and the de-mapping clock gap here is actually an SDH service clock gap. In this embodiment, the ODU service is de-mapped, in which the ODU service is mapped from a mapping end, the mapping clock gap is an ODU service clock gap, and an OTUk service is obtained by de-mapping, during the de-mapping, only when a uniform OTU service clock gap is recovered, the OTU service satisfying the clock performance can be recovered, so that the de-mapping clock gap is the OTU service clock gap. A frequency ratio of the OTU service to the ODU service is a fixed coefficient K=255/239, so that an OTUk service clock gap is obtained by multiplying the de-mapping clock gap by the coefficient K, in which the non-gap of the service clock gap indicates that the service data in the current clock cycle is the valid service data obtained by de-mapping, and the gap indicates that the data is invalid service data.

It should be understood by persons of ordinary skill in the art that steps 501 and 502 are not limited to a precedence order, and may be performed in parallel.

Step 503: Compare a non-gap statistical quantity of the data writing virtual clock with a non-gap statistical quantity of the service clock gap, and generate the de-mapping clock gap according to a comparison result.

Practically, the comparison between the non gap statistical quantity of the data writing virtual clock and the non-gap statistical quantity of the service clock gap is to compare de-mapping rates of the valid service data of the data frame and the OTU service data. If the non-gap statistical quantity of the data writing virtual clock is greater than the non-gap statistical quantity of the service clock gap, that is, the valid service data of the data frame is read relatively fast, and an UP signal is generated accordingly, the UP signal indicates that the de-mapping clock gap is a fast preformed scheduling pattern; if the non-gap statistical quantity of the data writing virtual clock is smaller than the non-gap statistical quantity of the service clock gap, that is, the valid service data of the data frame is read relatively slowly, and a DOWN signal is generated accordingly, the DOWN signal indicates that the de-mapping clock gap is a slow preformed scheduling pattern.

The fast preformed scheduling pattern and the slow preformed scheduling pattern are preset smooth clocks with uniform gaps, and a specific generation manner is provided as follows.

A clock frequency of the service is defined as f, and a clock frequency of OTUE is defined as $f_{OTEE}$.

A clock gap ratio of the fast preformed scheduling pattern is defined as F, and a clock gap ratio of the slow preformed scheduling pattern is defined as S. Frequencies of the fast preformed scheduling pattern and the slow preformed scheduling pattern are respectively:

$$f_{fast} = \frac{F}{1+F} f_{OTUE}$$

$$f_{slow} = \frac{S}{1+S} f_{OTUE}.$$

Generally, it is required that an interface frequency offset of the OTUE is less than or equal to a limit of ±20 ppm, and a frequency offset of the service data is less than or equal to ±Δppm. Correspondingly, it is required that the fast preformed scheduling pattern has the capability of tracking a frequency offset of +(20+Δ)ppm and the frequency of the fast pattern has the capability of tracking a frequency offset of −(20+Δ)ppm. That is, $$f_{fast} = \frac{F}{1+F} \times f_{OTUE} \geq (1 + (20+\Delta) \times 10^{-6})f$$

$$f_{slow} = \frac{S}{1+S} \times f_{OTUE} \leq (1 - (20+\Delta) \times 10^{-6})f$$

Therefore, the fast preformed scheduling pattern and the slow preformed scheduling pattern with uniform gaps are calculated.

Practically, the processing of this step is equivalent to a first-time phase-locked loop process, so that data writing virtual clock is basically synchronized with the service clock gap.

Step 504: Perform a phase-locked loop process on the de-mapping clock gap to obtain a recovery clock signal required by a de-mapping process.

The phase-locked loop process here is the common phase-locked loop process in the prior art, and is not limited in the present invention. For example, the specific phase-locked loop process may be implemented in the following two manners:

(1) The data to be de-mapped is written in a first-in-first-out buffer according to the de-mapping clock gap, and then the phase-locked loop process is performed on a reading and writing pointer signal of the first-in-first-out buffer, so as to obtain the de-mapping recovery service clock signal.

(2) A phase discrimination process is performed on the de-mapping clock gap, so as to obtain information after the phase discrimination process, and then the phase-locked loop process is performed on the clock signal to obtain the de-mapping recovery clock signal.

In the embodiment of the present invention, the payload value is inserted during the mapping, and the data writing virtual clock is generated according to the delivered payload value during the de-mapping, so as to generate the de-mapping clock gap to generate the recovery clock signal, thereby accomplishing mixed data transport and clock transparent transmission of the services of different rates and types in the OTN, and effectively reducing the large amount of jitter generated during the mapping and the de-mapping processes in the OTN.

Figure 6:
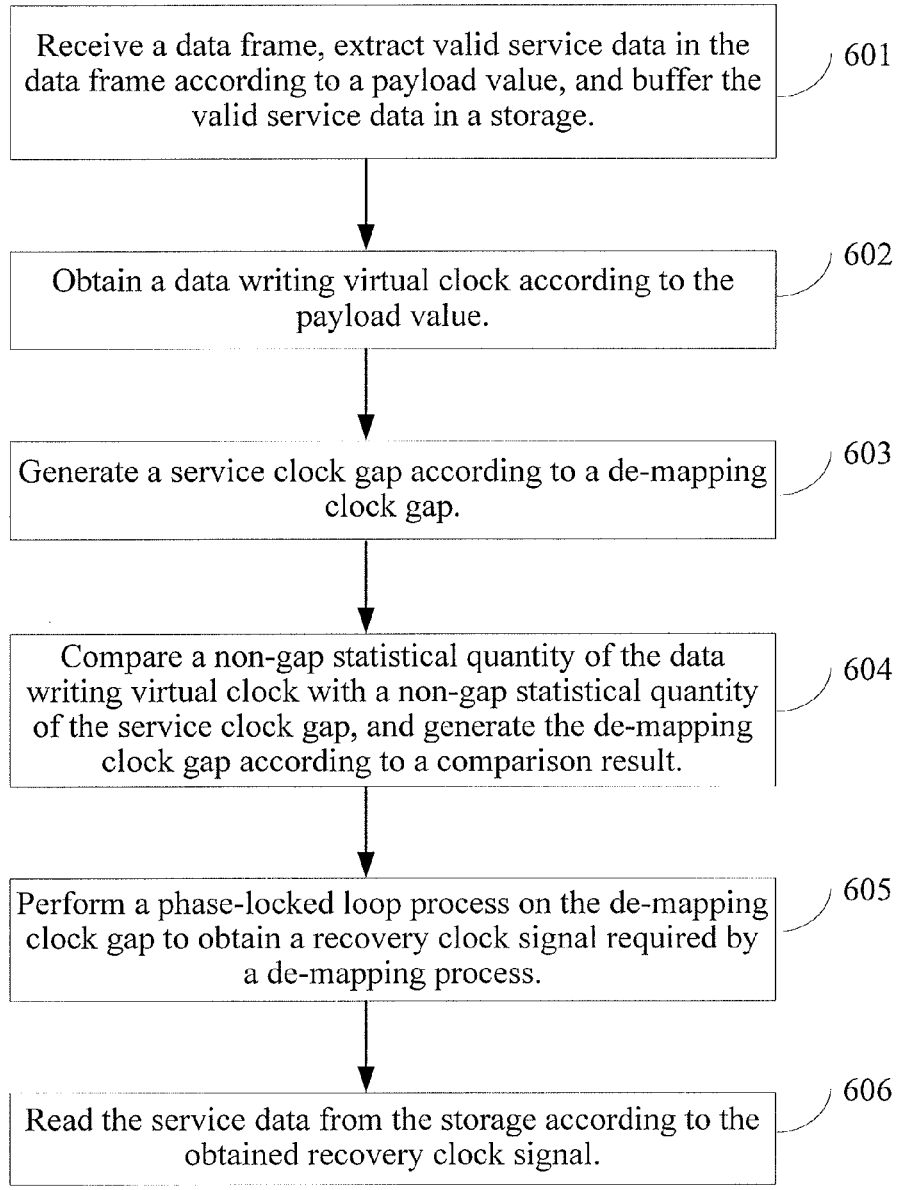
FIG. 6 is a flow chart of a de-mapping method in an OTN according to an embodiment of the present invention.

Referring to FIG. 6, in an embodiment, the present invention further provides a method for de-mapping service data in an OTN, which includes the following steps:

Step 601: Receive a data frame, extract valid service data in the data frame according to a payload value in the data frame, and buffer the valid service data in a storage unit.

The process of extracting the valid service data in the data frame according to the payload value includes: extracting the payload value in one group of data frames, generating a data writing clock according to the payload value, and extracting the valid service data in data frame according to the data writing clock.

Step 602: Obtain a data writing virtual clock according to the payload value.

The difference between the data writing clock and the data writing virtual clock lies in that, the former is a clock pulse directly generated according to the payload value, while the latter is a virtual and uniform valid data that indicates pulse and is obtained after a homogenization treatment is performed on the basis of the former.

Step 603: Generate a service clock gap according to a de-mapping clock gap.

The process of generating the service clock gap according to the de-mapping clock gap includes: obtaining the service clock gap according to the current de-mapping clock gap and a ratio of a valid service rate of mapping transmission to a service rate recovered by de-mapping. In the embodiment of the present invention, an ODU service is de-mapped, and a manner of generating the service clock gap is: multiplying the de-mapping clock gap by a coefficient K, where K=255/239.

Step 604: Compare a non-gap statistical quantity of the data writing virtual clock with a non-gap statistical quantity of the service clock gap, and generate the de-mapping clock gap according to a comparison result.

When the non-gap statistical quantity of the data writing virtual clock is greater than the non-gap statistical quantity of the service clock gap, it indicates that the valid service data of the data frame is read relatively fast, and an UP signal is generated, which indicates that the de-mapping clock gap is a fast preformed scheduling pattern; when the non-gap statistical quantity of the data writing virtual clock is smaller than the non-gap statistical quantity of the service clock gap, it indicates that the valid service data of the data frame is read relatively slowly, and a DOWN signal is generated, which indicates that the de-mapping clock gap is a slow preformed scheduling pattern.

Step 605: Perform a phase-locked loop process on the de-mapping clock gap to obtain a recovery clock signal required by a de-mapping process.

The recovery clock signal obtained by performing the phase-locked loop process two times truly and effectively reflects reading and writing differences between two sides of the de-mapping unit, and the service data is read according to the obtained recovery clock signal, thereby effectively eliminating jitter generated during the de-mapping process.

Step 606: Read the service data from the storage unit according to the obtained recovery clock signal.

After the service data is read from the storage unit according to the obtained recovery clock signal, the de-mapping of the ODU service data is completed.

In the embodiment of the present invention, the payload value is inserted during the mapping, and the container gaps are generated according to the delivered payload value during the de-mapping, so as to generate the de-mapping clock gap for recovering the clock, thereby accomplishing mixed data transport and clock transparent transmission of the services of different rates and types in the OTN, and synchronous de-mapping of the service data, and effectively filtering out a large amount of jitter generated during the mapping and the de-mapping processes in the OTN.

Persons of ordinary skill in the art should understand that all or a part of the steps of the method according to the embodiments of the present invention may be implemented by a computer program instructing relevant hardware. The program may be stored in a computer readable storage medium. When the program is run, the steps of the method according to the embodiments of the present invention are performed. The storage medium may be a magnetic disk, an optical disk, a Read-Only Memory (ROM), or a Random Access Memory (RAM).

Figure 7:
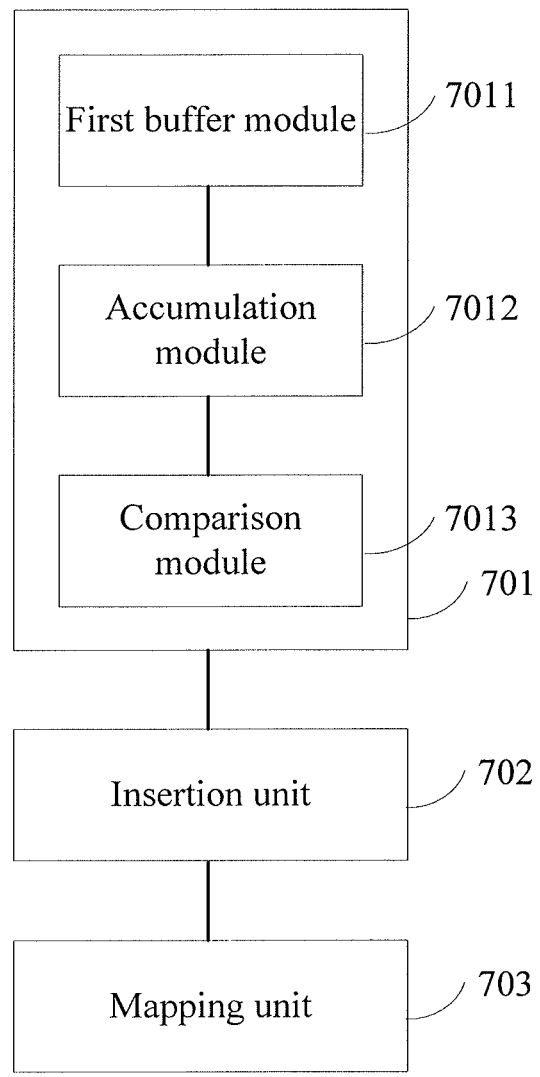
FIG. 7 is a structural view of a multiplexing and mapping apparatus in an OTN according to an embodiment of the present invention.

Referring to FIG. 7, in an embodiment, the present invention further provides a mapping apparatus in an OTN, which includes a calculation unit 701, an insertion unit 702, and a mapping unit 703.

The calculation unit 701 is configured to calculate and buffer a payload value of each path of service to be transmitted.

The insertion unit 702 is configured to insert the payload value calculated by the calculation unit 701 into a payload value region in frames having corresponding sequence numbers in one group of frames.

The mapping unit 703 is configured to map service data to the payload regions after the service data is respectively carried by corresponding containers according to a payload value in a previous group of frames, specifically, uniformly fill bytes of a payload value size in $M^{th}$ containers of all the frames of the group of frames according to a payload value in an $M^{th}$ frame in the previous group of frames.

The calculation unit 701 specifically includes a first buffer module 7011, an accumulation module 7012, and a comparison module 7013.

The first buffer module 7011 is configured to buffer a preset maximum payload value and a preset minimum payload value.

The accumulation module 7012 is configured to count an amount of service data to be transmitted currently, and obtain and output a service data accumulative value.

The comparison module 7013 is configured to compare the service data accumulative value currently output by the accumulation module 7012 with a historical payload value, in which if the service data accumulative value is greater than the historical payload value, it indicates that mapping transmission is too fast, and the minimum payload value buffered by the first buffer module 7011 is output; and if the service data accumulative value is less than the historical payload value, it indicates that mapping transmission is too slow, the maximum payload value buffered by the first buffer module 7011 is output.

In the multiplexing and mapping apparatus in the OTN provided in the embodiment of the present invention, by using the method for calculating the payload value, the mapping and the de-mapping are quite simply implemented, the complexity of recovering a de-mapping clock is reduced, and the performance of the recovered clock can be guaranteed. The payload value is calculated in advance in the previous group of frames, and the service data is carried in the next group of frames according to the payload value, so that the time is sufficient for uniformly filling the data, thereby preventing the jitter during the transmission process due to the non-uniform filling.

Figure 8:
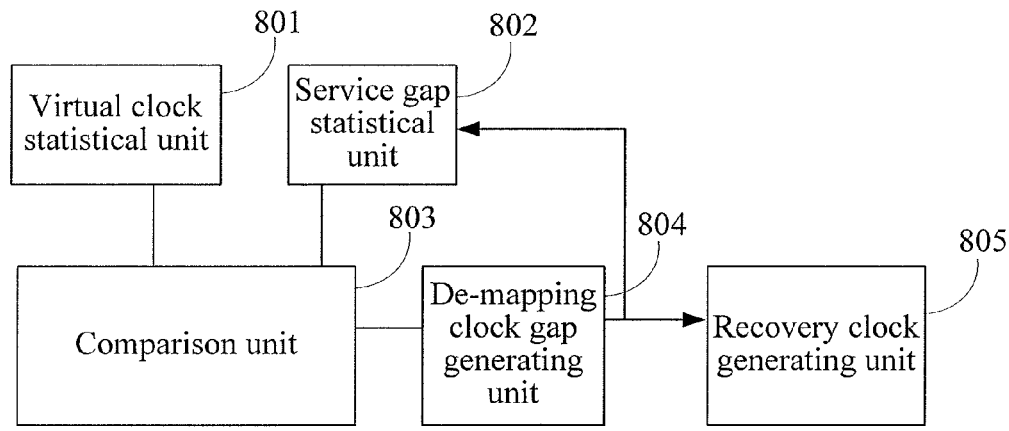
FIG. 8 is a structural view of an apparatus for generating a de-mapping clock in an OTN according to an embodiment of the present invention.

Correspondingly, referring to FIG. 8, in an embodiment, the present invention provides an apparatus for generating a de-mapping clock in an OTN, which includes a virtual clock statistic unit 801, a service gap statistic unit 802, a comparison unit 803, a de-mapping clock gap generating unit 804, and a recovery clock generating unit 805.

The virtual clock statistic unit 801 is configured to receive a data frame, obtain a data writing virtual clock according to a payload value in the data frame, and accumulate a non-gap quantity of the data writing virtual clock to obtain a non-gap statistical quantity of the data writing virtual clock.

The service gap statistic unit 802 is configured to count a non-gap statistical quantity of a service clock gap which may be obtained by multiplying a de-mapping clock gap generated by the de-mapping clock gap generating unit 804 by a coefficient K, where the coefficient K is a ratio of a current service rate recovered during de-mapping to a service data rate during mapping, and accumulate a non-gap quantity of the service clock gap to obtain the non-gap statistical quantity of the service clock gap.

The comparison unit 803 is configured to compare the non-gap statistical quantity of the data writing virtual clock output by the virtual clock statistic unit 801 with the non-gap statistical quantity of the service clock gap output by the service gap statistic unit 802, and output corresponding indication information according to a comparison result.

The de-mapping clock gap generating unit 804 is configured to output a fast preformed scheduling pattern when the indication information output by the comparison unit 803 indicates that the non-gap statistical quantity of the data writing virtual clock is greater than the non-gap statistical quantity of the service clock gap; and output a slow preformed scheduling pattern when the indication information output by the comparison unit 803 indicates that the non-gap statistical quantity of the data writing virtual clock is smaller than the non-gap statistical quantity of the service clock gap.

The recovery clock generating unit 805 is configured to perform a phase-locked loop process on the de-mapping clock gap obtained by the comparison unit 803, so as to obtain a recovery clock signal required by a de-mapping process.

The virtual clock statistic unit may further include a clock generating module, a virtual clock generating module, and a statistical module.

The clock generating module is configured to generate a data writing clock according to the payload value transmitted in each received group of OTUE data frames. For example, the clock generating module may know that the valid service data transmitted in each 16-frame OTUE clock cycle (assumed as P) is a sum (assumed as C) of the payload values carried by each frame, and thus obtain by performing calculation the situation of the uniform distribution of C in P, and generate the data writing clock according to the distribution of the valid service data.

The virtual clock generating module is configured to perform a homogenization treatment on the data writing clock obtained by the clock generating module, and obtain the data writing virtual clock.

The statistical module is configured to accumulate the non-gap quantity of the data writing virtual clock, so as to obtain the non-gap statistical quantity of the data writing virtual clock.

The de-mapping clock gap generating unit may further include a second buffer module and a gap generating module.

The second buffer module is configured to buffer the fast preformed scheduling pattern and the slow preformed scheduling pattern.

The gap generating module is configured to output the fast preformed scheduling pattern stored by the second buffer module when the indication information output by the comparison unit 803 indicates that the non-gap statistical quantity of the data writing virtual clock is greater than the non-gap statistical quantity of the service clock gap; and output the slow preformed scheduling pattern stored by the second buffer module when the indication information output by the comparison unit 803 indicates that the non-gap statistical quantity of the data writing virtual clock is smaller than the non-gap statistical quantity of the service clock gap.

In the embodiment of the present invention, the payload value is inserted during the mapping, and the container gaps are generated according to the delivered payload value during the de-mapping, so as to generate the de-mapping clock gap for recovering the clock, thereby accomplishing mixed data transport and clock transparent transmission of the services of different rates and types in the OTN, and effectively filtering out the large amount of jitter generated during the mapping and the de-mapping processes in the OTN.

Figure 9:
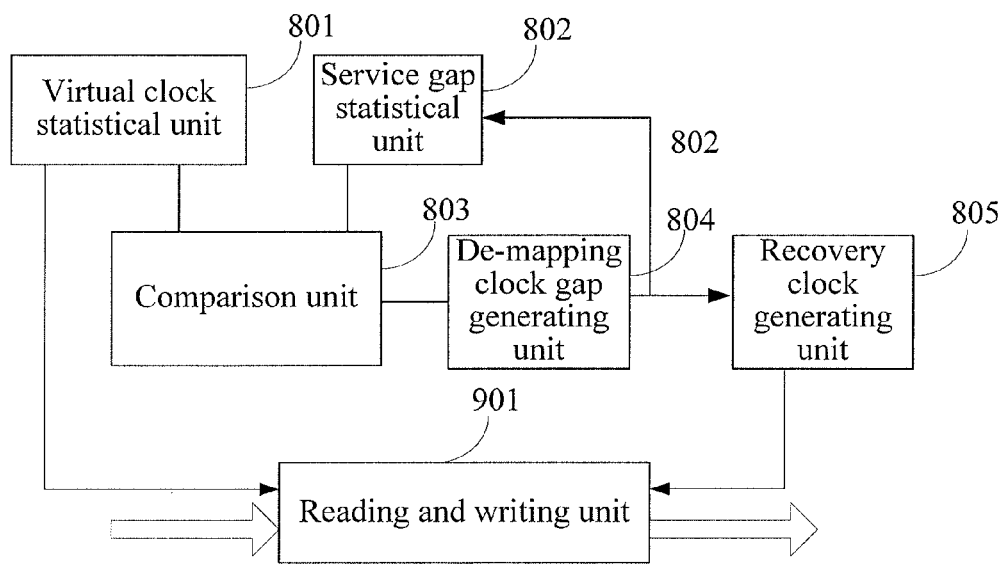
FIG. 9 is a structural view of a de-mapping apparatus in an OTN according to an embodiment of the present invention.

Referring to FIG. 9, in an embodiment, the present invention further provides an apparatus for de-mapping service data in an OTN, which includes a virtual clock statistic unit 801, a service gap statistic unit 802, a comparison unit 803, a de-mapping clock gap generating unit 804, a recovery clock generating unit 805, and a reading and writing unit 901.

The virtual clock statistic unit 801 is configured to receive a data frame, obtain a data writing clock and a data writing virtual clock according to a payload value in the data frame, and accumulate a non-gap quantity of the data writing virtual clock to obtain a non-gap statistical quantity of the data writing virtual clock.

The service gap statistic unit 802 is configured to count a non-gap statistical quantity of a service clock gap which may be obtained by multiplying a de-mapping clock gap generated by the de-mapping clock gap generating unit 804 by a coefficient K, where the coefficient K is a ratio of a current service rate recovered during de-mapping to a service data rate during mapping, and accumulate a non-gap quantity of the service clock gap to obtain the non-gap statistical quantity of the service clock gap.

The comparison unit 803 is configured to compare the non-gap statistical quantity of the data writing virtual clock output by the virtual clock statistic unit 801 with the non-gap statistical quantity of the service clock gap output by the service gap statistic unit 802, and output corresponding indication information according to a comparison result.

The de-mapping clock gap generating unit 804 is configured to output a fast preformed scheduling pattern when the indication information output by the comparison unit 803 indicates that the non-gap statistical quantity of the data writing virtual clock is greater than the non-gap statistical quantity of the service clock gap; and output a slow preformed scheduling pattern when the indication information output by the comparison unit 803 indicates that the non-gap statistical quantity of the data writing virtual clock is smaller than the non-gap statistical quantity of the service clock gap.

The recovery clock generating unit 805 is configured to perform a phase-locked loop process on the de-mapping clock gap obtained by the comparison unit 803, so as to obtain a recovery clock signal required by a de-mapping process.

The reading and writing unit 901 is configured to extract valid service data in the data frame according to the payload value in the data frame when receiving the data frame, buffer the valid service data, and read the valid service data according to the recovery clock signal generated by the recovery clock generating unit 805.

The virtual clock statistic unit further includes a clock generating module, a virtual clock generating module, and a statistical module.

The clock generating module is configured to generate the data writing clock according to the payload value transmitted in each received group of OTUE data frames. For example, the clock generating module may know that the valid service data transmitted in each 16-frame OTUE clock cycle (assumed as P) is a sum (assumed as C) of the payload values carried by each frame, and thus obtain by performing calculation the situation of the uniform distribution of C in P, and generate the data writing clock according to the distribution of the valid service data.

The virtual clock generating module is configured to perform a homogenization treatment on the data writing clock obtained by the clock generating module, and then obtain the data writing virtual clock.

The statistical module is configured to accumulate the non-gap quantity of the data writing virtual clock, so as to obtain the non-gap statistical quantity of the data writing virtual clock.

The reading and writing unit includes a third buffer module, a writing module, and a reading module.

The third buffer module is configured to buffer data.

The writing module is configured to extract the valid service data in the data according to the data writing clock generated by the clock generating module in the virtual clock statistic unit, and write the valid service data in the third buffer module.

The reading module is configured to read the valid service data from the third buffer module according to the recovery clock signal generated by the recovery clock generating unit 805.

In the embodiment of the present invention, the payload value is inserted during the mapping, and the container gaps are generated according to the delivered payload value during the de-mapping, so as to generate the de-mapping clock gap for recovering the clock, thereby accomplishing mixed data transport and clock transparent transmission of the services of different rates and types in the OTN, and synchronous de-mapping of the service data, and effectively filtering out the large amount of jitter generated during the mapping and the de-mapping processes in the OTN.

The above descriptions are merely several embodiments of the present invention. It will be apparent to persons skilled in the art that various modifications or variations can be made to the present invention without departing from the spirit and scope of the invention according to the disclosure of the application documents.

The invention claimed is:

1. A method for mapping service data, wherein the service data is carried by a plurality of frame groups, each frame group comprises at least two data frames, and each data frame comprises a payload value region and a payload region, the payload region comprises multiple containers, each of the containers is configured to carry service data of a service, the method comprises:

calculating a payload value according to the service data to be transmitted in a current frame group;

inserting the payload value into the payload value regions of a current frames in the current frame group, wherein the payload value is used to indicate an amount of service data carried by corresponding containers of data frames in a next frame group, the sequence number of the corresponding containers is the same as that of the current frame in the current frame group;

obtaining payload values from data frames of a previous frame group;

extracting and mapping service data to the containers of the payload region according to the previous payload values, wherein the amount of the service data mapped to each of the containers is determined by the payload values stored in the data frames of a previous frame group.

2. The method according to claim 1, wherein the data frame is an Optical Channel Transport Unit (OTU), and the payload value region locates in an Optical Channel Payload Unit (OPU) Overhead (OH) region.

3. The method according to claim 1, wherein the calculating a payload value according to the service data to be transmitted in a current frame group comprises:

presetting a maximum payload value and a minimum payload value according to the service and a rate of the current data frame;

counting an amount of service data to be transmitted in the current frame to obtain a service data accumulative value;

comparing the service data accumulative value with a historical payload value, wherein the historical payload value is a payload value calculated for the last data frame of the current frame group, if the historical payload value is greater than the service data accumulative value, a current payload value is the preset minimum payload value, and if the historical payload value is less than the service data accumulative value, the current payload value is the preset maximum payload value.

4. An apparatus for mapping service data, wherein the service data is carried by the plurality of frame groups, each frame group comprises at least two data frames, and each data frame comprises a payload value region and a payload region, the payload region comprises multiple containers, each of the containers is configured for carrying service data of a service, and the apparatus comprises:

a calculation unit, configured to calculate a payload value according to the service data to be transmitted in a current frame group;

an insertion unit, configured to insert the payload value into the payload value regions of the current frames in the current frame group, wherein the payload value is used to indicate an amount of service data carried by corresponding containers of data frames in a next frame group, the sequence number of the corresponding containers is the same with that of the current frame in the current frame group; and a mapping unit, configured to extract and map service data to the containers of the payload region according to previous payload values from data frames of a previous frame group, wherein the amount of the service data mapped to each of the containers is determined by the payload values stored in the data frames of a previous frame group.

5. The apparatus according to claim 4, wherein the calculation unit comprises:

a first buffer module, configured to buffer a preset maximum payload value and a preset minimum payload value;

an accumulation module, configured to count an amount of the service data to be transmitted currently, obtain a service data accumulative value, and buffer the service data accumulative value; and a comparison module, configured to compare the service data accumulative value currently output by the accumulation module with a historical payload value, wherein if the service data accumulative value is greater than the historical payload value, the minimum payload value buffered by the first buffer module is output; and if the service data accumulative value is less than the historical payload value, the maximum payload value buffered by the first buffer module is output.

* * * * *